July 4, 1950 — W. STRUMBOS — 2,514,014
CIGARETTE HOLDER FOR AUTOMOBILES
Filed April 22, 1949
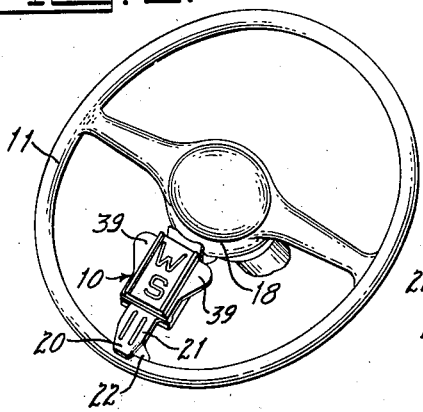
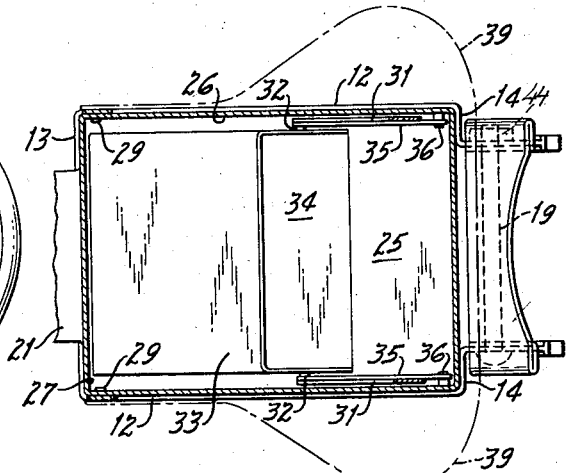
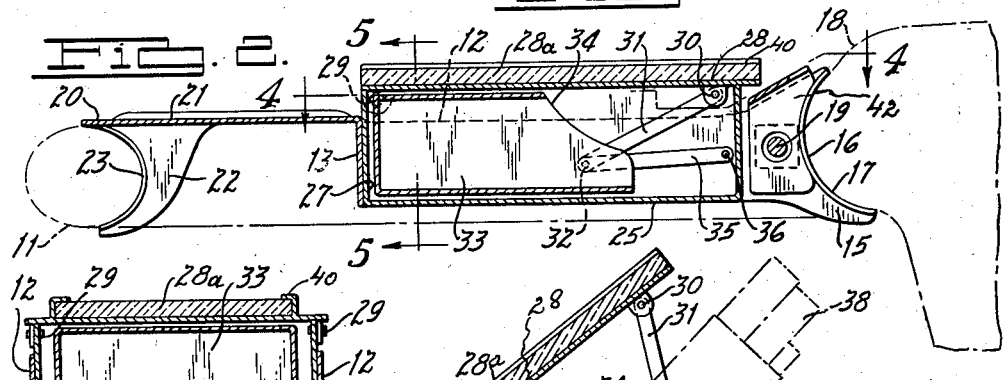
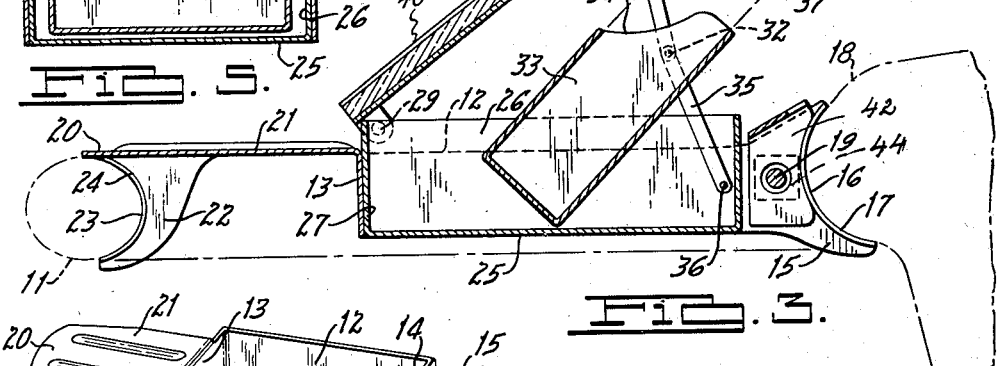
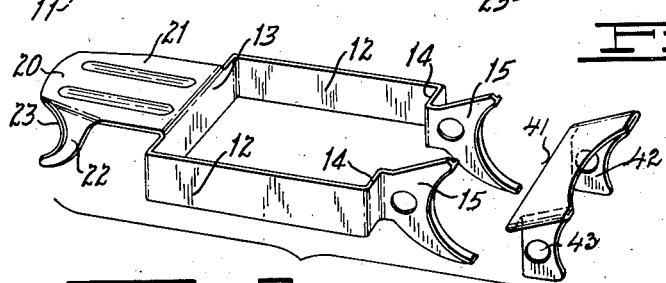
INVENTOR:
William Strumbos,
BY Louis Chayka
ATTORNEY.

Patented July 4, 1950

2,514,014

UNITED STATES PATENT OFFICE 2,514,014

CIGARETTE HOLDER FOR AUTOMOBILES

William Strumbos, Detroit, Mich.

Application April 22, 1949, Serial No. 89,121

4 Claims. (Cl. 206—19.5)

My improvement pertains to a cigarette holder especially adapted to be mounted upon the steering wheel of an automobile. The purpose of my improvement is to provide a holder fitting into the structural design of a steering wheel without being obtrusive and yet providing means against crushing the cigarettes, and including means for bringing the cigarettes into a position where they may be readily taken out when desired.

I shall now describe my improvement with reference to the accompanying drawings in which:

Figure 1 is a perspective view of a steering wheel showing my cigarette holder mounted thereon;

Figure 2 is a sectional view of a part of the steering wheel and of my holder in its closed position;

Figure 3 is a sectional view of my holder as mounted upon the steering wheel, but shown in its open position;

Figure 4 is a sectional view on line 4—4 of Figure 2;

Figure 5 is a sectional view on line 5—5 of Figure 2;

Figure 6 is a perspective view of a bracket forming a part of my holder, and a complementary member thereof.

Similar numerals refer to similar parts throughout the several views.

The holder, including a supporting bracket, is generally indicated by numeral 10, and is shown in Figure 1 in its position upon a steering wheel 11. Made of sheet metal, the bracket, best shown in Figure 5, has the form of a rectangular U-shaped clamp and includes two vertical side walls 12, a vertical wall 13 connecting the side walls, while at the opposite end the side walls are first turned inwardly, as shown at 14, and then bent at a right angle to extend parallel to the side walls and to form arms 15. Each arm is defined at its outer end by an arcuate recess 16, the marginal portion of the arm along the recess being provided with a flange 17. The recesses are designed to fit the contour of the hub portion 18 of the steering wheel. As a means of holding the arms together, they are provided with holes for reception of a bolt 19.

At the opposite end, the bracket includes an integrally connected brace 20 for engagement with the rim of the steering wheel. The brace includes a flat strip 21 disposed substantially in the plane of the steering wheel upon which the bracket is to be mounted, the strip having at its outer end two wings 22 bent downwardly at a right angle to said strip. The wings are recessed at their respective outer ends, as shown at 23, to fit edgewise against the curvature of rim 11 of the steering wheel. A flange 24 along the marginal outline of each recess prevents cutting action against the rim.

Disposed within the bracket is a rectangular container including a flat bottom 25, upright side walls 26, end walls 27, and a cover 28 hinged at one end 29 to the said walls 26, as best shown in Figure 3. At the opposite end the cover, on its underside, is provided on each side with an ear 30 for a pivotal connection to links 31. These in turn are pivotally affixed at 32 to the sides of bucket 33 made in the shape of a rectangular box open at one end, as shown at 34. Another pair of links 35 is at one end pivotally affixed to the bucket at each side thereof, at 32, while at the other end the pair is pivotally affixed to the walls 26 of the container, at 36. Normally, said cover 28 is in a parallel relation to bottom 25 of said container and said links 31 and 35 are folded, as shown in Figure 2, while said bucket lies on the bottom 25 of said container. When the cover is raised to the position shown in Figure 3, the bucket is swung upwardly by links 31 to an inclined position, the open end 34 being easily accessible from above. The bucket, it will be understood, is the member designed to contain a pack of cigarettes with the wrapper partly torn off at one end so that said cigarettes may be conveniently removed, one by one. The position of the pack 37 is shown in dotted lines in Figure 3, the individual cigarettes being marked 38. For convenience in swinging cover 28 upwardly from its hinged connection 29, said cover is made with laterally extending wings 39, the shape of the wings being immaterial. For the sake of a more attractive appearance, the cover includes a plastic plate 28a, held in place by inverted L-shaped strips 40, as best shown in Figure 5.

Seated upon arms 15 so as to conceal bolt 19 from above, is a blade 41 provided with two legs 42, each of the legs having a hole 43. The legs fit between arms 15, the holes in said legs being in register with the holes in the arms so that bolt 19 may pass through all said holes. A tightening nut at one end of the bolt is marked 44.

The operation of the holder is quite obvious. It will be understood that the cigarettes will be contained in the bucket and that the cover 28 will be normally closed. When it is desired to remove a cigarette from the bucket, the cover is swung upwardly by means of said wings 39. This will bring the bucket to an upwardly inclined position so that the individual cigarettes will be accessible for removal from above. A push upon the cover will be sufficient to return it to its position parallel to bottom 25 and to return the bucket to its initial position, as shown in Figure 2.

At this point I would like to describe the manner in which the bracket is mounted on the steering wheel. In order to accomplish this, the bolt 19 is loosened and the side walls 12 of the bracket are spread apart while brace 20 is brought into position against the rim of the steering wheel. The rectangular container, with the bucket therein, is placed within the clamp between the side walls 12, whereupon the side walls are brought together by means of the bolt 19 and the nut 44, so that the recesses in arms 15 will be brought into abutment against the hub portion of the steering wheel, this resulting also in the clamping of the container between the side walls 12 of the bracket.

It will be obvious that some minor changes may be made in the shape of the bracket and the manner in which said bracket is combined with the container supported thereby, without deviating from the inventive principle disclosed herein.

What I therefore wish to claim is as follows:

1. In combination with an automobile steering wheel including a hub portion and a rim, a bracket for a cigarette container, the bracket including a substantially rectangular U-shaped clamp, including two upright side walls and a transverse wall joining them, the ends of the side walls being defined by arcuate recesses to fit the hub portion of the wheel, a brace extending from the transverse wall in the plane of the wheel, the brace having downwardly turned wings recessed at their ends for abutment against the rim of the wheel, a rectangular cigarette container within the clamp, the container including upright walls, and a bolt to draw together the side walls of the clamp against the upright walls of the container.

2. In combination with an automobile steering wheel including a hub and a rim, a bracket for a cigarette container, the bracket including a substantially U-shaped clamp including two parallel side walls and a transverse wall joining the same at one end, the opposite ends of the walls being engaged edgewise against the hub, a brace extending from the transverse wall away from the hub, said brace having at its outer end two wings disposed parallel to the side walls and recessed at their outer ends for edgewise engagement with the rim, a rectangular container for cigarettes within the clamp, and a bolt to draw the clamp tight against the outer surface of the container.

3. In combination with an automobile steering wheel including a hub and a rim, a bracket for a cigarette container, the bracket including a substantially U-shaped clamp including two parallel side walls and a transverse wall joining the same at one end, each of the outer ends being first bent inwardly towards the other side wall and then again bent at a right angle to extend parallel to said other wall, each of said ends having an arcuate recess therein for an edgewise abutment against the body of the hub, a flat brace in the plane of the wheel extending from the transverse wall of the clamp towards the rim and including two integrally connected side wings disposed parallel to the side walls of the clamp and adapted to bear edgewise against the rim, each wing having a recess to fit said rim, a rectangular cigarette container within the clamp, and bolt means to draw the side walls towards each other against the outer sides of the container.

4. In combination with an automobile steering wheel including a centrally located hub and a concentric rim, a bracket mounted upon said wheel, the bracket comprising a substantially U-shaped clamp including two parallel arms and a transverse member joining the arms at one end, a brace extending from the transverse member against the rim for engagement therewith, the arms of the clamp at the end remote from the transverse member being in abutment with the hub, a cigarette container within the clamp, the container having a hinged cover and side walls parallel to the arms of the clamp, and a bolt means to draw the arms of the clamp against the sides of the container for binding engagement therewith.

WILLIAM STRUMBOS.

No references cited.